United States Patent [19]

Güethner et al.

[11] Patent Number: 5,043,578

[45] Date of Patent: Aug. 27, 1991

[54] WRITING ATOMIC SCALE FEATURES WITH FINE TIP AS SOURCE OF DEPOSITED ATOMS

[75] Inventors: Peter H. Güethner, Konstanz, Fed. Rep. of Germany; Harry J. Mamin; Daniel Rugar, both of Palo Alto, Calif.

[73] Assignee: International Business Machines Corporation, Armonk, N.Y.

[21] Appl. No.: 505,281

[22] Filed: Apr. 5, 1990

[51] Int. Cl.$^5$ .............................................. H01J 37/30
[52] U.S. Cl. ................................... 250/307; 250/306; 250/492.2; 369/101
[58] Field of Search ................ 250/492.2, 306, 423 F, 250/307; 369/101, 126

[56] References Cited

U.S. PATENT DOCUMENTS

| | | | |
|---|---|---|---|
| 4,343,993 | 8/1982 | Binnig et al. | 250/306 |
| 4,539,089 | 9/1985 | Binnig et al. | 427/431 |
| 4,575,822 | 3/1986 | Quate | 365/174 |
| 4,829,507 | 5/1989 | Kazan et al. | 369/126 |
| 4,896,044 | 1/1990 | Li et al. | 250/492.3 |
| 4,906,840 | 3/1990 | Zdeblick et al. | 250/306 |
| 4,907,195 | 3/1990 | Kazan et al. | 250/306 |

FOREIGN PATENT DOCUMENTS 63-265101  1/1988  Japan .

OTHER PUBLICATIONS

J. Schneir et al., Tunneling Microscopy, Lithography, and Surface Diffusion on an Easily Prepared, Atomically Flat Gold Surface, Journal of Applied Physics, vol. 63, No. 3, Feb. 1988, pp. 717–721.
Tsong, Field Ion Image Formation, Surface Science, vol. 70, 1978, pp. 211–213.

Primary Examiner—Bruce C. Anderson
Attorney, Agent, or Firm—Henry E. Otto, Jr.

[57] ABSTRACT

Submicron structures are written on a surface by positioning in nanometer range proximity, preferably within current tunneling range, of the surface a scanning tip of a material that emits atoms upon application of an applied voltage of low magnitude. While the tip is maintained within said range, it is moved relative to the surface, and a series of short voltage pulses are concurrently applied between the tip and surface. These pulses cause atoms of tip material to directly transfer to the surface and concurrently cause remaining atoms of tip material to migrate to the tip and continuously reform the tip and maintain its sharp configuration, thereby insuring uninterrupted writing ability. Various tip materials exhibiting low field evaporation potentials may be used; however, gold is preferred if deposition is to be under ambient conditions. Heating the tip enhances the ability of the material to emit atoms. The deposited structures may be selectively sensed or erased by application of appropriate voltages.

9 Claims, 1 Drawing Sheet

WRITING ATOMIC SCALE FEATURES WITH FINE TIP AS SOURCE OF DEPOSITED ATOMS

This invention relates to a method and means for depositing atoms on a surface of a substrate, and more particularly to writing on such a surface by scanning a fine tip within nanometer range of the surface and depositing atoms of and from the tip in discrete or continuous relationship on the surface without interrupting the writing ability of the tip.

BACKGROUND OF THE INVENTION

The following is a description of the most pertinent prior art of which applicants are aware:

The basic patent describing a scanning tunneling microscope (STM) is U.S. Pat. No. 4,343,993. An STM is an instrument capable of sensing atomic scale variations in the height of a surface by maintaining tunneling current constant as the surface is being scanned. This STM technology has been extended to various applications employing a tunneling tip in close proximity to a surface for producing surface modifications.

U.S. Pat. No. 4,829,507 discloses a method of writing indicia on an adsorbent carrier surface of a recording medium by using a tunneling tip and adding individual adsorbate atomic particles to the surface from a source other than the tip.

An article in the Feb. 1, 1988 issue of Journal of Applied Physics at pp. 717-721, discloses the use of a tunneling tip of platinum-iridium material which is moved to within current tunneling range of a gold surface which is coated with a fluorocarbon grease. Applying a voltage of roughly 1 volt between the tip and surface for roughly 1 second results in a balling up of the gold under the tip, leaving a small well-defined bump. Gold is preferred under ambient conditions because it does not oxidize, and the grease provides an additional protective coating. Platinum-iridium tips are commercially available and rather inert. This process has the disadvantage of being slow since voltage pulses of approximately 1 second are required. Also, the bump is not formed from atomic particles provided by the tunneling tip as the source.

U.S. Pat. No. 4,896,044 discloses use of a tunneling tip which is moved within current tunneling range over a gold surface to remove gold atoms from the surface and thereby pit the surface at selected locations for writing indicia thereat. Again, there is no teaching or suggestion of depositing atomic particles removed from a tunneling tip.

The unexamined Japanese Patent Application published Nov. 1, 1988 as 63-265101 in the Patent Abstracts of Japan discloses a way to reform a STM tip by applying a high voltage to it, causing atoms to be evaporated in the high electric field. There is no teaching or even suggestion of collecting the emitted atoms for any purpose, nor any reason to believe that such evaporation might be localized and continuous as part of a writing process.

There is a need for a simplified, efficient, reliable method of writing rapidly on a surface by depositing atomic scale structures on the surface with a scanning or tunneling tip in a manner which can be effected at ambient temperature and pressure.

SUMMARY OF THE INVENTION

Toward this end and according to the invention, submicron structures are written on a surface by positioning in nanometer range proximity, preferably within current tunneling range, of the surface a scanning tip of a material that emits atoms upon application of an applied voltage of low magnitude. While the tip is maintained within said range, it is moved relative to the surface, and a series of short voltage pulses are concurrently applied between the tip and surface. These pulses cause atoms of tip material to directly transfer to the surface and concurrently cause remaining atoms of tip material to migrate to the tip and continuously reform the tip and maintain its sharp configuration, thereby insuring uninterrupted writing ability. Various tip materials exhibiting low field evaporation potentials may be used; however, gold is preferred if deposition is to be under ambient conditions. Heating the tip enhances the ability of the material to emit atoms. The deposited structures may be selectively sensed or erased by application of appropriate voltages.

DESCRIPTION OF PREFERRED EMBODIMENTS

Figure 1:
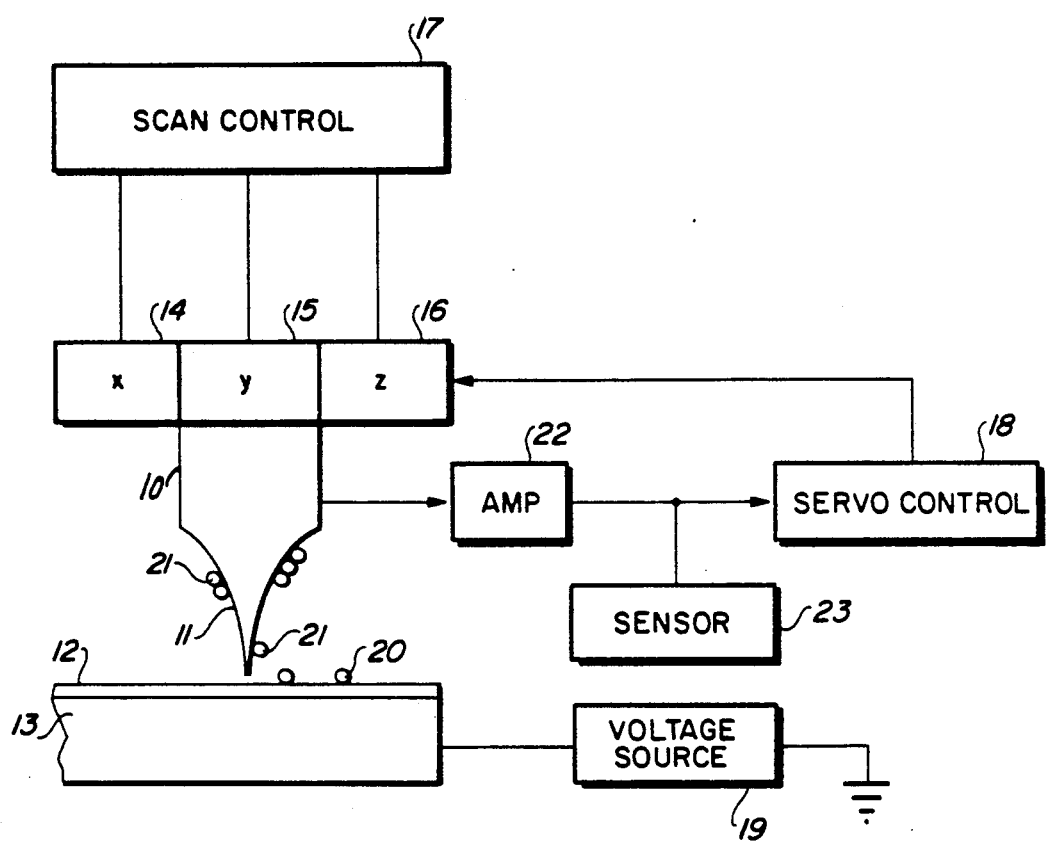
FIG. 1 is a simplified schematic diagram showing the basic components of an apparatus for practicing the invention.

FIG. 1 depicts the basic components of a scanning apparatus required to practice the method according to the invention. As illustrated, the apparatus (like an STM) comprises a conducting probe 10 having a sharp scanning tip 11 that preferably is disposed within tunneling current range (e.g., less than 2 nm) of an adsorbent surface 12 on a conductive substrate 13. Probe 10 and hence tip 11 are movable in x, y and z directions relative to surface 12 by piezo drives 14,15,16, respectively. Scan control means 17 is connected via drives 14, 15 and 16 to probe 10 to control movement of the probe tip 11 relative to substrate 13. A servo control means 18 is connected to z drive 16 to respond to variations in tunneling current so as to maintain a constant tip/surface separation. For additional description, if desired, the reader is referred to U.S. Pat. Nos. 4,343,993, 4,575,822 or 4,829,507, all of which are incorporated herein by reference.

According to the invention, probe 10 is composed of a material that emits atoms when a voltage of low magnitude is applied to substrate 13 from a suitable source 19. Source 19 may be a Model 8112A voltage pulse generator marketed by Hewlett-Packard Company.

To write a submicron structure on surface 12, scan control means 17 conditions drive 16 to move in the z direction to bring tip 11 within current tunneling range from surface 12. Then scan control means 17 conditions drives 14,15 to move probe 10 in the x and/or y directions relative to surface 12 while a series of short voltage pulses are applied between tip 11 and surface 12 to cause atoms of tip material to transfer directly to said surface and deposit as marks 20 thereon. The typical size of these bumps or marks 20 is of the order of about 10 nm, which would provide for storage application areal densities greater than $2 \times 10^{12}$ bits/in. sq. As these atoms transfer to surface 12, the electric field applied between tip 11 and surface 12 causes atoms 21 still on the probe to migrate toward the end of the tip. This continuously reforms tip 11 to maintain its sharp configuration.

Thus, according to an important feature of the invention, tip 11 "heals" itself because as atoms at the tip are pulled off, they are replaced by other atoms 21 of the tip material. This desirably and unexpectedly insures uninterrupted writing ability of the tip. This atom emission phenomenon is not fully understood, but it is believed that the atoms are transferred from the tip to the surface by field evaporation emission, which is enhanced by the close proximity between tip 11 and surface 12.

Tip 11 is preferably of gold because gold does not oxidize and the atom transfer can thus be performed under ambient pressure and temperature conditions. The electric field required for field evaporation from gold is also relatively low, as can be determined from a table of Field Evaporation Data found on pp. 212-213 of an article in Vol. 70 (1978) of Surface Science. Tip 11 must be sharp. Preferably it is electrochemically etched from gold wire; e.g., by immersing the tip portion of the probe in an etchant of concentrated hydrochloric acid and applying about 2 v direct current to the etchant. This etching method can provide a tip having a radius of less than one micron. Such a tip is relatively inert and hence very suitable for use as a scanning tip.

In actual test, deposition was performed on a gold (111) surface prepared by melting a gold wire in a torch to obtain a faceted surface (although the surface may, if preferred, be prepared by growing a gold film epitaxially on mica). With gold tip 11 within current tunneling range of surface 12, virtually 100% probability of atomic particle transfer was achieved when voltage pulses of 4.0 v height and a width of 500 ns to as little as 100 ns were applied between the tip and substrate and when voltage pulses of 5.0 v height and widths as little as 10 ns were applied between the tip and substrate. In both cases, structures less than 10 nm in diameter were deposited. The polarity of the tip 11 with respect to surface 12 can be either positive or negative. However, it has been observed in actual tests that writing is more controllable when tip 11 is negative with respect to surface 12.

It was noted that, after writing over 2000 marks, there was no significant degradation of the tip and writing ability continued unimpaired. Also, when marks (like 20) were written and then examined at much later times, no significant diffusion of the deposited structures was observed. If, over an extended period, diffusion does occur however, it may be effectively eliminated by using a substrate surface to which the material deposited from the tip 11 is strongly bonded.

The method and apparatus were also employed by applicants for writing submicron structures on a silicon surface, thus demonstrating the capability to deposit nanometer-size circuit elements. Thus, surface 12 may be on a data storage medium, with the transferred atoms constituting bits of data; or the surface may be part of an electronic circuit, with the transferred atoms collectively constituting circuit elements; or the surface may be part of a mask used to lithographically form integrated circuits.

While tip 11 preferably is of gold, it may if desired be of silver, lead, copper, indium, cobalt, nickel, iron, niobium, titanium, platinum, or aluminum. All of these materials are known to require substantially less electric field for field evaporation than tungsten, which is typically used as the tunneling tip material. By heating probe 10 and hence tip 11 while write pulses are being applied, the ability of these probe materials to emit atoms can be enhanced or facilitated; this, in turn, may reduce the time and voltage required for atom transfer.

To read the bumps or other submicron structures (like circuit elements or mask elements) thus deposited, scan control means 17 acts through z drive 16 to move probe 10 toward surface 12 to bring tip 11 to within current tunneling range while a substantially reduced voltage (e.g., about 0.1-1.0 v) is maintained by source 19 between the tip and substrate. Tunneling current between tip and substrate is then sensed by a read amplifier 22. As tip 11 scans surface 12, changes in topography caused by the written marks 20 will modulate the tip/surface separation distances. This in turn will cause substantial modulation in the tunnel current at the amplifier 22. The amplified signal is fed to servo control means 18 as an electronic servo feedback to cause z drive 16 to maintain the tip/surface separation constant. As illustrated, a sensor 23 senses and records variations in the output of the current amplifier 22; however, if preferred, the readout signal may be the output signal generated by servo control means 18 to the z drive 16 in response to this amplifier output.

Erasing can be achieved by selectively removing the atoms which form the marks 20. This can be done by positioning tip 11 directly over a selected mark and applying an erase pulse of appropriate voltage between the tip and surface. Instead of depositing additional atoms on surface 12, atoms are removed from the surface. This is because the selected mark 20, which is itself a very sharp feature, now becomes the "tip", and emits atoms upon application of the voltage pulse because the transfer will occur from the tip 11 or the mark 20 depending upon which is sharper.

It should also be noted that while tip/surface separation for writing and reading the marks 20 (or circuit or mask elements) has been described hereinabove as being maintained with a scanning apparatus that senses changes in tunneling current, any technique which is sensitive to variations in tip/surface separation, such as measuring capacitance or atomic forces, can be employed provided it has the necessary resolution.

As thus far described, the method has been practiced by positioning and then moving tip 11 within current tunneling range of surface 12. This is preferred to reduce the magnitude of the voltage required between tip 11 and substrate 13 to effect atomic particle transfer as both the voltage and mark size increase with tip/surface separation. However, applicants have found that transfer can be effected even if tip 11 is positioned beyond the current tunneling range (such as at 2 nm from surface 12) provided higher voltage pulses are applied between the tip and surface. Hence, as used in the claims, the term "atom transfer range" is intended generically to denote a tip/surface separation range at which transfer can occur, whether within or beyond the current tunneling range. Applicants found that the voltage required between tip 11 and surface 12 to effect deposition should be at least 2 v/nm separation distance.

In summary, according to the invention, atoms of and from a sharp tip of a scanning apparatus are directly transferred by short, low voltage pulses to a surface by a "self-healing" technique by which atoms migrate to the tip to continuously replenish those transferred. Submicron structures, in the form of circuit elements or mask elements or data bits, less than 10 nm in diameter are created on the surface in as little as 10 ns without requiring a developing step or use of a liquid on the surface. Transfer may be effected in air under ambient temperature and pressure conditions.

While the invention has been shown and described with respect to preferred embodiments thereof, it will be understood by those skilled in the art that changes in form and detail may be made in these embodiments without departing from the scope and teaching of the invention. Accordingly, the methods and apparatus herein disclosed are to be considered merely as illustrative, and the invention is to be limited only as specified in the claims.

We claim:

1. A method of writing submicron structures on a surface, comprising the steps of:
providing an apparatus having a sharp scanning wire composed entirely of a material that when subjected to an applied voltage of low magnitude emits atoms from the tip of said wire;
positioning the tip of the wire within atom transfer range of the surface; and
while maintaining the tip of the wire within atom transfer range, moving the tip laterally relative to the surface and concurrently applying a series of short voltage pulses to the wire of a magnitude and duration sufficient to cause atoms of wire material to directly transfer to and write on the surface and concurrently cause remaining atoms of the wire material to continuously reform the tip and maintain its sharp configuration, thereby insuring uninterrupted writing ability until the supply of wire is substantially exhausted.

2. The method of claim 1, including the step of:
erasing the submicron structures by:
positioning and maintaining the tip within atom transfer range of the surface; and
applying a series of short voltage pulses to the tip of a magnitude sufficient to cause atoms previously deposited on the surface to be attracted to and deposited on the tip while the tip is positioned over the atoms to be removed.

3. The method of claim 2, including the step of:
rewriting over the surface with atoms from the wire after atoms have been removed therefrom, thereby to provide a storage medium with a reusable storage surface.

4. The method of claim 1, wherein the polarity of the tip relative to the surface is negative.

5. The method of claim 1, wherein, for storage applications, the applying step is conducted at ambient temperature and atmosphere.

6. The method of claim 1, wherein the tip material is gold.

7. The method of claim 1, wherein said transfer is effected in as little as 10 nanoseconds and produces a structure less than 10 nanometers in diameter.

8. The method of claim 1, wherein the surface is part of an electronic circuit and the transferred atoms collectively constitute circuit elements.

9. The method of claim 1, wherein the surface is part of a mask used to lithographically form integrated circuits.

* * * * *